United States Patent
Komatsu et al.

(10) Patent No.: US 12,060,925 B2
(45) Date of Patent: Aug. 13, 2024

(54) TOROIDAL CONTINUOUSLY VARIABLE TRANSMISSION

(71) Applicant: KAWASAKI JUKOGYO KABUSHIKI KAISHA, Kobe (JP)

(72) Inventors: Kenji Komatsu, Kobe (JP); Hideyuki Imai, Kobe (JP); Kenichiro Tanaka, Kobe (JP); Kippei Matsuda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 94 days.

(21) Appl. No.: 17/763,782

(22) PCT Filed: Oct. 6, 2020

(86) PCT No.: PCT/JP2020/037856
§ 371 (c)(1),
(2) Date: Mar. 25, 2022

(87) PCT Pub. No.: WO2021/070816
PCT Pub. Date: Apr. 15, 2021

(65) Prior Publication Data
US 2022/0333671 A1 Oct. 20, 2022

(30) Foreign Application Priority Data
Oct. 9, 2019 (JP) .................... 2019-185623

(51) Int. Cl.
*F16H 15/38* (2006.01)
*F16C 19/10* (2006.01)
*F16H 37/08* (2006.01)

(52) U.S. Cl.
CPC ............. *F16H 15/38* (2013.01); *F16C 19/10* (2013.01); *F16H 37/086* (2013.01); *F16H 2015/383* (2013.01)

(58) Field of Classification Search
CPC .......................... F16H 15/38; F16H 2015/383
(Continued)

(56) References Cited

U.S. PATENT DOCUMENTS 4,909,092 A * 3/1990 Machida ................. F16H 15/38
476/40
5,971,886 A * 10/1999 Yamamoto .............. F16H 15/38
476/42

(Continued)

FOREIGN PATENT DOCUMENTS

| JP | 2001-158400 A | 6/2001 |
| JP | 2002-250423 A | 9/2002 |
| JP | 2013-204604 A | 10/2013 |

OTHER PUBLICATIONS

International Search Report for PCT/JP2020/037586, dated Nov. 2, 2020.

*Primary Examiner* — William C Joyce
(74) *Attorney, Agent, or Firm* — Sughrue Mion, PLLC

(57) ABSTRACT

A toroidal continuously variable transmission includes a rotating shaft, a pair of discs, at least one power roller, and at least one bearing arranged between the rotating shaft and a casing. At least one of the pair of discs includes: a disc main body including a concave surface opposed to the power roller; and a cylindrical portion projecting from the disc main body along the rotation axis toward an opposite side of the power roller. The cylindrical portion is inserted between the bearing and the rotating shaft.

8 Claims, 2 Drawing Sheets

(58) Field of Classification Search
USPC .......................................................... 476/42
See application file for complete search history.

(56) References Cited

U.S. PATENT DOCUMENTS

| | | |
|---|---|---|
| 6,066,068 A | 5/2000 | Takemura et al. |
| 2001/0003108 A1 | 6/2001 | Goi et al. |
| 2013/0260954 A1 | 10/2013 | Arai et al. |

* cited by examiner

TOROIDAL CONTINUOUSLY VARIABLE TRANSMISSION

CROSS REFERENCE TO RELATED APPLICATIONS

This application is a National Stage of International Application No. PCT/JP2020/037856 filed Oct. 6, 2020, claiming priority based on Japanese Patent Application No. 2019-185623 filed Oct. 9, 2019.

TECHNICAL FIELD

One aspect of the present disclosure relates to a toroidal continuously variable transmission.

BACKGROUND ART

In a toroidal continuously variable transmission, a power roller is sandwiched between a pair of discs, and a change gear ratio is continuously changed by tilting the power roller (see PTL 1, for example). The toroidal continuously variable transmission includes a loading cam press (axial force generator) including: a cam plate that rotates coaxially with the discs; and a roller group including rollers that are sandwiched between the disc and the cam plate and lined up in a radial direction. In the loading cam press, as transmission torque increases, the disc is pressed so as to move away from the cam plate by the cam action. With this, an input disc and an output disc are biased so as to approach each other, and the power roller is sandwiched by adequate contact pressure.

CITATION LIST

Patent Literature

PTL 1: Japanese Laid-Open Patent Application Publication No. 2001-158400

SUMMARY OF INVENTION

Technical Problem

A part of the disc in a circumferential direction is in contact with the power roller. Therefore, when the disc rotates while being pressed by the press in a direction along the rotation axis, the disc repeats minute elastic deformation, and minute vibration occurs. With this, minute reciprocating sliding may act between a back end surface of the disc and a bearing adjacent to the disc in the direction along the rotation axis, and fretting wear may occur.

Solution to Problem

A toroidal continuously variable transmission according to one aspect of the present disclosure includes: a rotating shaft; at least one pair of discs arranged around a rotation axis of the rotating shaft and opposed to each other; at least one power roller sandwiched between the at least one pair of discs so as to be tiltable; and at least one bearing arranged between the rotating shaft and the casing. At least one of the pair of discs includes a disc main body including a concave surface opposed to the power roller and a cylindrical portion projecting from the disc main body along the rotation axis toward an opposite side of the power roller. The cylindrical portion is inserted between the bearing and the rotating shaft.

According to the above configuration, the cylindrical portion of the disc projects long from the disc main body so as to be inserted between the bearing and the rotating shaft. Therefore, while preventing the entire transmission from increasing in size in the direction along the rotation axis, an end surface of the cylindrical portion can be positioned far away from the concave surface of the disc main body. On this account, even when the disc main body repeats the elastic deformation by the reaction force applied from the power roller, the deformation hardly reaches the end surface of the cylindrical portion of the disc. Thus, minute reciprocating sliding generated between a back end surface (end surface of the cylindrical portion) of the disc and an adjacent part can be reduced, and the generation of fretting wear can be suppressed.

As one example, the cylindrical portion may project in a direction along the rotation axis toward an opposite side of the disc main body across an outer ring of the bearing.

According to the above configuration, since the cylindrical portion projects adequately long from the disc main body, the deformation of the disc main body further hardly reaches the end surface of the cylindrical portion.

As one example, the toroidal continuously variable transmission may further include a gear arranged around the rotation axis of the rotating shaft and connected to one of the pair of discs so as to transmit power to the disc. The at least one pair of discs may comprise two pairs of discs lined up in the direction along the rotation axis. The at least one power roller may comprise a pair of power rollers sandwiched by the two pairs of discs. The two pairs of discs may include a pair of middle discs adjacent to each other and a pair of outer discs arranged outside the pair of middle discs in the direction along the rotation axis, each power roller being sandwiched between the middle disc and the outer disc. The cylindrical portion may be included in the middle disc. The at least one bearing may comprise a pair of bearings located at both sides of the gear in the direction along the rotation axis. Each of the pair of bearings may include an outer ring, an inner ring, and a rolling element. The cylindrical portion of the middle disc, the inner ring, and the gear may be press-fitted to each other.

According to the above configuration, the cylindrical portion of the middle disc, the inner ring of the bearing, and the gear are press-fitted to each other, and therefore, deform integrally. On this account, the generation of the minute reciprocating sliding among the middle disc, the bearing, and the gear can be prevented. Moreover, since respective loads acting toward the gear through the bearings from the pair of middle discs are canceled at the middle gear, the generation of the vibration is suppressed from this point of view.

As one example, the inner ring may include an inner ring main body opposed to the outer ring in a radial direction and an inner ring extension projecting in the direction along the rotation axis from the inner ring main body toward the gear beyond the outer ring. The gear may include a recess opposed to the inner ring extension. The cylindrical portion may be press-fitted to the inner ring. The inner ring extension may be press-fitted to the recess of the gear.

According to the above configuration, the middle disc, the inner ring, and the gear can be integrated with each other by simple configuration.

As one example, the inner ring may further include an end wall projecting from the inner ring extension toward a radially inner side so as to be sandwiched between an end surface of the cylindrical portion and a bottom surface of the recess.

According to the above configuration, a contact area between the cylindrical portion and the inner ring increases, and a contact area between the inner ring and the gear increases. Thus, the cylindrical portion, the inner ring, and the gear can be satisfactorily integrated with each other.

As one example, the cylindrical portion may include: a supporting portion supported by the rotating shaft from a radially inner side; and a thin portion that is located closer to the disc main body than the supporting portion, is thinner than the supporting portion, and is located away from the rotating shaft toward a radially outer side.

According to the above configuration, the cylindrical portion easily deforms at the thin portion and hardly deforms at the supporting portion. Therefore, the deformation of the disc main body hardly reaches the end surface of the cylindrical portion. On this account, the minute reciprocating sliding generated between the end surface of the cylindrical portion of the disc and an adjacent part can be further reduced.

As one example, the cylindrical portion may be arranged at a radially outer side of a radially inner end of the disc main body.

According to the above configuration, since a position where the disc main body is supported by the cylindrical portion is located at the radially outer side, the deformation of the disc main body by the reaction force from the power roller can be suppressed.

Advantageous Effects of Invention

According to the present disclosure, the generation of the fretting wear on the back end surface of the disc can be suppressed.

DESCRIPTION OF EMBODIMENTS

Hereinafter, an embodiment will be described with reference to the drawings.

Figure 1:
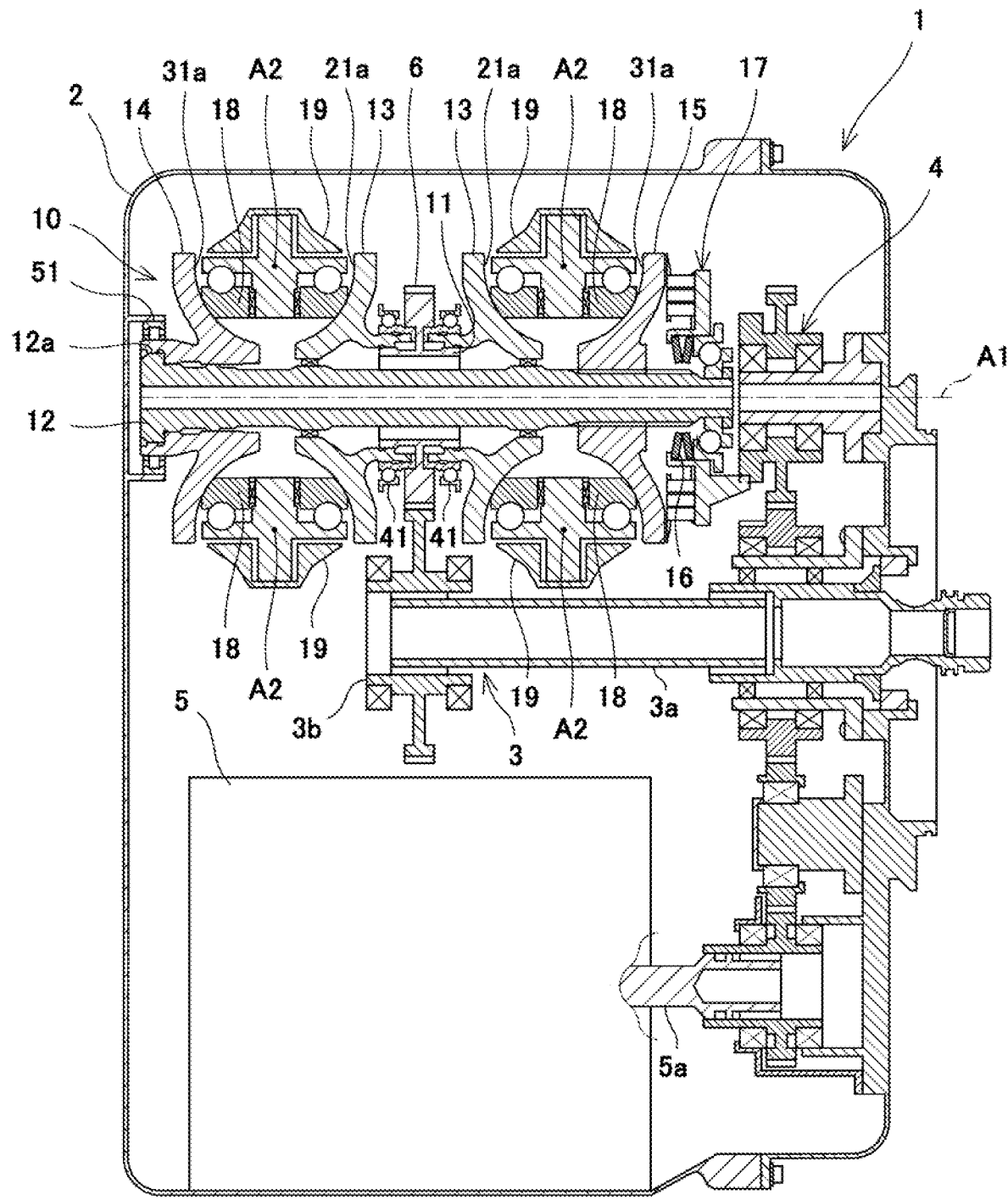
FIG. 1 is a sectional view of a drive mechanism-integrated power generator including a toroidal continuously variable transmission according to an embodiment.

FIG. 1 is a sectional view of a drive mechanism-integrated power generator 1 including a toroidal continuously variable transmission 10 according to the embodiment. As shown in FIG. 1, the drive mechanism-integrated power generator 1 (Integrated Drive Generator; hereinafter referred to as an "IDG") is used as an AC power supply of an aircraft and includes a casing 2 attached to an engine of the aircraft. The casing 2 accommodates an input mechanism 3, the toroidal continuously variable transmission 10 (hereinafter referred to as a "transmission"), a power transmission mechanism 4, and a power generator 5. The toroidal continuously variable transmission 10 does not have to be a part of the drive mechanism-integrated power generator, and the application thereof is not limited to the aircraft.

The transmission 10 includes a transmission input shaft 11 (rotating shaft) and a transmission output shaft 12 (rotating shaft) which are coaxially arranged and are relatively rotatable (an axis of the transmission input shaft 11 and the transmission output shaft 12 is hereinafter referred to as a "rotation axis A1"). In the present embodiment, the transmission input shaft 11 serves as the transmission input shaft. However, an input gear and an input shaft which are independent from each other may be coupled to each other so as to be able to transmit power. The transmission input shaft 11 is connected to an engine rotating shaft (not shown) through the input mechanism 3. The input mechanism 3 includes: a device input shaft 3a to which rotational power is input from the engine rotating shaft; and a gear 3b that rotates integrally with the device input shaft 3a. A gear 6 is located at the transmission input shaft 11 so as to rotate integrally with the transmission input shaft 11. In the present embodiment, the gear 6 and the transmission input shaft 11 are integrated with each other as one piece. The transmission output shaft 12 is connected to a power generator input shaft 5a of the power generator 5 through the power transmission mechanism 4 (for example, a gear train).

The rotational power taken out from the engine rotating shaft is input to the transmission input shaft 11 through the input mechanism 3, and the rotational power of the transmission input shaft 11 is transmitted to input discs 13. The transmission 10 changes the speed of the rotation of the transmission input shaft 11 and outputs the rotation to the transmission output shaft 12. The rotational power of the transmission output shaft 12 is transmitted to the power generator input shaft 5a through the power transmission mechanism 4. When the power generator input shaft 5a is rotated, the power generator 5 generates AC power. A change gear ratio of the transmission 10 is continuously changed such that the rotational speed of the power generator input shaft 5a is maintained at an appropriate value (value corresponding to a frequency suitable for operation of electric components of the aircraft) regardless of the fluctuation of the rotational speed of the engine rotating shaft.

As one example, the transmission 10 is a half-toroidal, double-cavity transmission and includes one input disc 13 and an output disc 14 as a pair and further includes the other input disc 13 and an output disc 15 as another pair. The input discs 13 are fitted to the transmission input shaft 11 so as to rotate integrally with the transmission input shaft 11. The output discs 13 to 15 are fitted to the transmission output shaft 12 so as to rotate integrally with the transmission output shaft 12. The two pairs of discs 13 to 15 are arranged adjacent to each other in a direction along the rotation axis A1 so as to rotate about the rotation axis A1. The input discs 13 and the output discs 14 and 15 are opposed to each other in the direction along the rotation axis A1 of the transmission 10 and include concave surfaces 21a and 31a opposed to each other. The input discs 13 and the output discs 14 and 15 form cavities, each of which is annular about the rotation axis A1, by the concave surfaces 21a and 31a. The transmission is not limited to a double-cavity transmission and may be, for example, a single-cavity transmission.

As one example, the transmission 10 is a middle input transmission. The transmission output shaft 12 is inserted into the transmission input shaft 11 and projects from the transmission input shaft 11 toward both sides. The pair of input discs 13 are middle discs arranged back to back on the transmission input shaft 11. The pair of output discs 14 and 15 are outer discs arranged outside the pair of input discs 13 in the direction along the rotation axis A1. The gear 3b that rotates integrally with the transmission input shaft 11 is disposed on an outer peripheral surface of the transmission input shaft 11 and arranged between the pair of input discs 13.

The movement of the output disc 14 outward along the rotation axis A1 is restricted by a projection 12a projecting in a radial direction of the transmission output shaft 12. The output disc 15 is biased toward the input disc 13 by a preload spring 16. During rotational driving, the output disc 15 is biased toward the input disc 13 by a press 17. The press 17 is, for example, a loading cam press. The output discs 14 and 15 are connected to the power transmission mechanism 4 through the press 17 so as to be able to transmit power to the power transmission mechanism 4. The transmission 10 includes: power rollers 18 arranged in the cavities; and trunnions 19 that support the power rollers 18 such that the power rollers 18 are tiltable.

Each of the trunnions 19 is supported by the casing 2 so as to be tiltable about a corresponding tilt axis A2 and movable in a direction along the corresponding tilt axis A2. Each tilt axis A2 and the rotation axis A1 are skew lines. The power roller 18 is supported by the trunnion 19 so as to be rotatable about a rotation axis A3 perpendicular to the tilt axis A2. The trunnion 19 is connected to a hydraulic drive mechanism (not shown), and the hydraulic drive mechanism makes the trunnion 19 reciprocate together with the power roller 18 in a direction along the tilt axis A2.

When the input discs 13 are rotated, the output discs 14 and 15 are rotated through the power rollers 18, and the transmission output shaft 12 is rotated. When the trunnion 19 and the power roller 18 move in the direction along the tilt axis A2, a tilt angle of the power roller 18 about the tilt axis A2 is changed, and the change gear ratio of the transmission 10 is continuously changed in accordance with the tilt angle. The power roller 18 is sandwiched between the concave surface 21a of the input disc 13 and the concave surface 31a of the output disc 14 or 15 so as to be tiltable about the tilt axis A2, changes the speed of the rotational driving force of the input disc 13 at the change gear ratio corresponding to the tilt angle, and transmits the rotational driving force to the output disc 14 or 15. When rotational torque of the output disc 14 increases, the output disc 15 is pressed by the press 17 so as to approach the input disc 13. Thus, pressure by which the input discs 13 and the output discs 14 and 15 sandwich the power rollers 18 increases.

Figure 2:
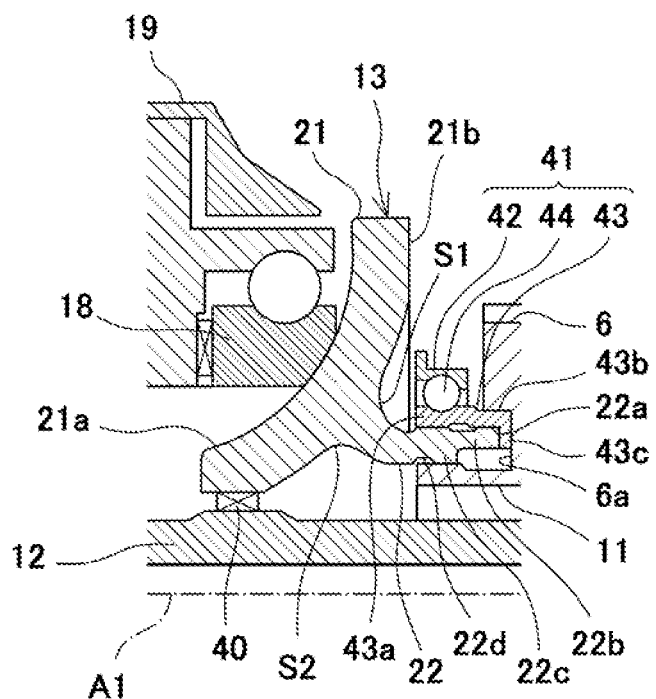
FIG. 2 is an enlarged view showing a middle disc and its vicinity in the toroidal continuously variable transmission shown in FIG. 1.

FIG. 2 is an enlarged view showing the input disc 13 (middle disc) and its vicinity in the toroidal continuously variable transmission 10 shown in FIG. 1. The pair of input discs 13 are arranged at both sides of the gear 6 in the direction along the rotation axis A1. A support structure that supports the pair of input discs 13 is symmetrical in the direction along the rotation axis A1. As shown in FIG. 2, the input disc 13 includes: a disc main body 21 including the concave surface 21a opposed to the power roller 18; and a cylindrical portion 22 projecting from the disc main body 21 along the rotation axis A1 toward an opposite side of the power roller 18. The disc main body 21 has a circular-arc section. The cylindrical portion 22 extends in the direction along the rotation axis A1 toward the concave surface 21a beyond a back surface 21b (surface closer to the gear 6) of the disc main body 21 and is connected to the disc main body 21. The input disc 13 is supported by the transmission output shaft 12 through a bearing 40 so as to be rotatable.

The cylindrical portion 22 is arranged at a radially outer side of a radially inner end of the disc main body 21. To be specific, an inner diameter of a radially inner end of the cylindrical portion 22 is larger than an inner diameter of the radially inner end of the disc main body 21. With this, since a position where the disc main body 21 is supported by the cylindrical portion 22 is located at the radially outer side, deformation of the disc main body 21 by reaction force from the power roller 18 is suppressed.

A bearing 41 is arranged between the disc main body 21 and the gear 6 in the direction along the rotation axis A1. The bearing 41 indirectly supports the transmission input shaft 11 with respect to the casing 2 (see FIG. 1) such that the transmission input shaft 11 is rotatable. Specifically, the cylindrical portion 22 is inserted between the bearing 41 and the transmission input shaft 11, and the bearing 41 directly supports the cylindrical portion 22 of the input disc 13, which rotates together with the transmission input shaft 11, such that the cylindrical portion 22 of the input disc 13 is rotatable. An end surface 22a of the cylindrical portion 22 which surface faces in the direction along the rotation axis A1 and is in contact with an adjacent part is located at a position farther away from the concave surface 21a than an end of the back surface 21b of the disc main body 21 which end is located farthest from the power roller 18 in the direction along the rotation axis A1.

The cylindrical portion 22 of the input disc 13 projects long from the disc main body 21 so as to be inserted between the bearing 41 and the transmission input shaft 11. Therefore, while preventing the entire transmission 10 from increasing in size in the direction along the rotation axis A1, the end surface 22a of the cylindrical portion 22 can be positioned far away from the concave surface 21a of the disc main body 21. On this account, even when the disc main body 21 repeats the elastic deformation by the reaction force applied from the power roller 18, the deformation hardly reaches the end surface 22a of the cylindrical portion 22.

The back surface 21b of the disc main body 21 includes a recess S1 that is recessed toward the concave surface 21a as the recess S1 approaches the cylindrical portion 22. An inner peripheral surface of the cylindrical portion 22 includes a recess S2 that is recessed toward the radially outer side as the recess S2 approaches the disc main body 21, the recess S2 being closer to the concave surface 21a than the transmission input shaft 11 in the direction along the rotation axis A1.

The bearing 41 includes an outer ring 42, an inner ring 43, and a rolling element 44 sandwiched between the outer ring 42 and the inner ring 43 so as to be rotatable. The inner ring 43 includes an inner ring main body 43a, an inner ring extension 43b, and an end wall 43c. The inner ring main body 43a is a cylindrical part of the inner ring 43 which part is opposed to the outer ring 42 in the radial direction. The inner ring extension 43b is a cylindrical part projecting in the direction along the rotation axis A1 from the inner ring main body 43a toward the gear 6 beyond the outer ring 42. The end wall 43c is a flange portion projecting from the inner ring extension 43b toward a radially inner side.

The cylindrical portion 22 projects in the direction along the rotation axis A1 toward an opposite side of the disc main body 21 (toward the gear 6) across the outer ring 42 of the bearing 41. With this, the cylindrical portion 22 projects adequately long from the disc main body 21, and therefore, the deformation of the disc main body 21 further hardly reaches the end surface 2a of the cylindrical portion 22.

The cylindrical portion 22 of the input disc 13 is internally fitted to the inner ring 43 of the bearing 41 in a press-fitted state. Recesses 6a opposed to the inner ring extensions 43b are located on both side surfaces of the gear 6 in the direction along the rotation axis A1. The inner ring extension 43b of the inner ring 43 is internally fitted to the recess 6a of the gear 6 in a press-fitted state. As above, since the cylindrical portion 22 of the input disc 13, the inner ring 43 of the bearing 41, and the gear 6 are press-fitted to each other, these deform integrally.

The end wall 43c of the inner ring 43 is sandwiched between the end surface 22a of the cylindrical portion 22 of the input disc 13 and a bottom surface (surface including a normal line extending in the direction along the rotation axis A1) of the recess 6a of the gear 6. With this, a contact area between the cylindrical portion 22 and the inner ring 43 increases, and a contact area between the inner ring 43 and the gear 6 also increases. Thus, the cylindrical portion 22, the inner ring 43, and the gear 6 are further favorably integrated with each other.

As above, since the cylindrical portion 22, the inner ring 43, and the gear 6 are integrated with each other, the generation of minute reciprocating sliding at contact interfaces is prevented. Moreover, since respective loads acting toward the gear 6 through the bearings 41 from the pair of input discs 13 arranged at both sides of the gear 6 are canceled at the gear 6, the generation of the vibration is suppressed also from this point of view.

The cylindrical portion 22 of the input disc 13 may serve as the inner ring 43 of the bearing 41. In this case, the cylindrical portion 22 that serves as the inner ring may be press-fitted to the recess 6a of the gear 6. Moreover, the inner ring 43 of the bearing 41 may be integrated with the gear 6. In this case, the cylindrical portion 22 of the input disc 13 may be press-fitted to the inner ring 43 integrated with the gear 6.

The cylindrical portion 22 includes a tip portion 22b, a supporting portion 22c, and a thin portion 22d. The tip portion 22b is a cylindrical part located at a tip side of the cylindrical portion 22 (located closer to the gear 6) in the direction along the rotation axis A1. The supporting portion 22c is a cylindrical part that is located closer to the disc main body 21 than the tip portion 22b and is thicker than the tip portion 22b. Herein, an inner peripheral surface of the supporting portion 22c includes a spline coupled to the transmission input shaft 11 such that the supporting portion 22c rotates together with the transmission input shaft 11. The thin portion 22d is a cylindrical part that is located closer to the disc main body 21 than the supporting portion 22c and is thinner than the supporting portion 22c. The supporting portion 22c is supported by the transmission input shaft 11 from the radially inner side, but the thin portion 22d is located away from the transmission input shaft 11.

The cylindrical portion 22 easily deforms at the thin portion 22d and hardly deforms at the supporting portion 22c. Therefore, the deformation of the disc main body 21 hardly reaches the tip portion 22b of the cylindrical portion 22. On this account, minute reciprocating sliding generated between the end surface 22a (end surface of the tip portion 22b) of the cylindrical portion 22 and the end wall 43c is reduced, and minute reciprocating sliding generated between the end wall 43c and the gear 6 is also reduced.

According to the above configuration, even when the rotating input disc 13 receives periodic reaction force from the power roller 18, and the disc main body 21 repeats elastic deformation, the deformation hardly reaches the end surface 22a of the cylindrical portion 22 of the input disc 13. Therefore, minute reciprocating sliding is reduced on the end surface 22a of the cylindrical portion 22 of the input disc 13, and the generation of fretting wear is suppressed.

Figure 3:
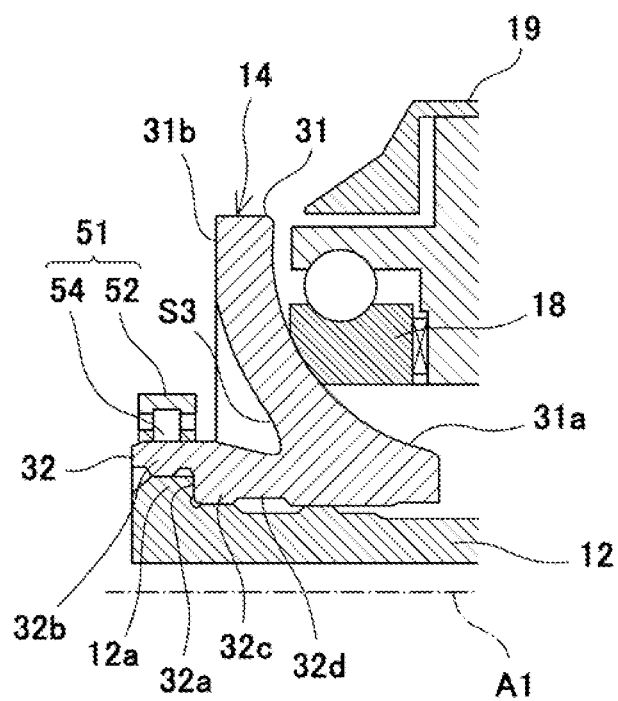
FIG. 3 is an enlarged view showing an outer disc and its vicinity in the toroidal continuously variable transmission shown in FIG. 1.

FIG. 3 is an enlarged view showing the output disc 14 (outer disc) and its vicinity in the toroidal continuously variable transmission 10 shown in FIG. 1. The pair of output discs 14 and 15 are arranged at both sides of the input discs 13 in the direction along the rotation axis A1. The output disc 15 is the same in shape as a conventional output disc, and the output disc 14 is different in shape from the conventional output disc. As shown in FIG. 3, the output disc 14 includes: a disc main body 31 including the concave surface 31a opposed to the power roller 18; and a cylindrical portion 32 projecting from the disc main body 31 along the rotation axis A1 toward an opposite side of the power roller 18. The disc main body 31 has a circular-arc section. The cylindrical portion 32 extends in the direction along the rotation axis A1 toward the concave surface 31a beyond a back surface 31b (surface opposite to the concave surface 31a) of the disc main body 31 and is connected to the disc main body 31.

A bearing 51 is arranged at the radially outer side of the projection 12a of the transmission output shaft 12. The bearing 51 is arranged outside the disc main body 31 in the direction along the rotation axis A1. The bearing 51 includes an outer ring 52 and a rolling element 54 sandwiched between the outer ring 52 and the cylindrical portion 32 so as to be rotatable. To be specific, the bearing 51 does not include an inner ring, and the cylindrical portion 32 serves as the inner ring. The bearing 51 may include the inner ring. In this case, the inner ring of the bearing 51 may be press-fitted to the cylindrical portion 32 of the output disc 14.

The bearing 51 indirectly supports the transmission output shaft 12 with respect to the casing 2 (see FIG. 1) such that the transmission output shaft 12 is rotatable. Specifically, the cylindrical portion 32 is inserted between the bearing 51 and the transmission output shaft 12, and the bearing 51 directly supports the cylindrical portion 32 of the output disc 14, which rotates together with the transmission output shaft 12, such that the cylindrical portion 32 of the output disc 14 is rotatable. An end surface 32a of the cylindrical portion 32 which surface faces in the direction along the rotation axis A1 and is in contact with an adjacent part is located at a position farther away from the concave surface 31a than an end of the back surface 31b of the disc main body 31 which end is located farthest from the power roller 18 in the direction along the rotation axis A1. An end surface of a tip portion 32b of the cylindrical portion 32 which surface faces in the direction along the rotation axis A1 is not in contact with any part.

The cylindrical portion 32 of the output disc 14 projects long from the disc main body 31 so as to be inserted between the bearing 51 and the transmission output shaft 12. Therefore, while preventing the entire transmission 10 from increasing in size in the direction along the rotation axis A1, the end surface 32a of the cylindrical portion 32 can be positioned far away from the concave surface 31a of the disc main body 31. On this account, even when the disc main body 31 repeats the elastic deformation by the reaction force applied from the power roller 18, the deformation hardly reaches the end surface 32a of the cylindrical portion 32.

The back surface 31b of the disc main body 31 includes a recess S3 that is recessed toward the concave surface 31a as the recess S3 approaches the cylindrical portion 32. The cylindrical portion 32 includes the tip portion 32b, a supporting portion 32c, and a thin portion 32d. The tip portion 32b is a cylindrical part located at a tip side of the cylindrical portion 32 in the direction along the rotation axis A1 and is externally fitted to the projection 12a of the transmission output shaft 12. Herein, an inner peripheral surface of the tip portion 32b includes a spline coupled to the transmission output shaft 12 such that the tip portion 32b rotates together with the transmission output shaft 12. The supporting portion 32c is a cylindrical part that is located closer to the disc main body 21 than the tip portion 32b and is thicker than the tip portion 32b. The end surface 32a of the supporting portion 32c which surface faces in the direction along the rotation axis A1 is in contact with a side surface of the projection 12a of the transmission output shaft 12.

The thin portion 32d is a cylindrical part that is located closer to the disc main body 21 than the supporting portion 32c and is thinner than the supporting portion 32c. The thin portion 32d is arranged at a position overlapping the recess S3 in the direction along the rotation axis A1. The supporting portion 32c is supported by the transmission output shaft 12 from the radially inner side, but the thin portion 32d is located away from the transmission output shaft 12.

The cylindrical portion 32 easily deforms at the thin portion 32d and hardly deforms at the supporting portion 32c. Therefore, the deformation of the disc main body 31 hardly reaches the supporting portion 32c of the cylindrical portion 32. On this account, minute reciprocating sliding generated between the end surface 32a (end surface of the supporting portion 32c) of the cylindrical portion 32 and the side surface of the projection 12a of the transmission output shaft 12 is reduced.

According to the above configuration, even when the rotating output disc 14 receives the periodic reaction force from the power roller 18, and the disc main body 31 repeats the elastic deformation, the deformation hardly reaches the end surface 32a of the cylindrical portion 32 of the output disc 14. Therefore, minute reciprocating sliding is reduced on the end surface 32a of the cylindrical portion 32 of the output disc 14, and the generation of the fretting wear is suppressed.

The present disclosure is not limited to the above-described embodiment, and modifications, additions, and eliminations may be made with respect to the configuration of the embodiment. For example, the transmission is not limited to a middle input transmission and may be a middle output transmission. In the case of the middle output transmission, a positional relation between the input disc 13 and the output disc 14 is reversed, i.e., the output disc is the middle disc, and the input disc is the outer disc.

The invention claimed is:

1. A toroidal continuously variable transmission comprising:
   a rotating shaft;
   at least one pair of discs arranged around a rotation axis of the rotating shaft and opposed to each other;
   at least one power roller sandwiched between the at least one pair of discs so as to be tiltable;
   at least one bearing arranged between the rotating shaft and a casing; wherein:
   at least one of the pair of discs includes
      a disc main body including a concave surface opposed to the power roller and
      a cylindrical portion projecting from the disc main body along the rotation axis toward an opposite side of the power roller; and
   the cylindrical portion is inserted between the bearing and the rotating shaft;
   the cylindrical portion includes:
   a supporting portion supported by the rotating shaft from a radially inner side; and
   a thin portion that is located closer to the disc main body than the supporting portion, is thinner than the supporting portion, and is located away from the rotating shaft toward a radially outer side.

2. The toroidal continuously variable transmission according to claim 1, wherein
   the bearing includes an outer ring, an inner ring, and a rolling element; and
   the cylindrical portion is inserted between the inner ring of the bearing and the rotating shaft.

3. The toroidal continuously variable transmission according to claim 1, wherein the cylindrical portion projects in a direction along the rotation axis toward an opposite side of the disc main body across an outer ring of the bearing.

4. The toroidal continuously variable transmission according to claim 1, further comprising a gear arranged around the rotation axis of the rotating shaft and connected to one of the pair of discs so as to transmit power to the disc, wherein:
   the at least one pair of discs comprises two pairs of discs lined up in the direction along the rotation axis;
   the at least one power roller comprises a pair of power rollers sandwiched by the two pairs of discs;
   the two pairs of discs include
      a pair of middle discs adjacent to each other and
      a pair of outer discs arranged outside the pair of middle discs in the direction along the rotation axis, each power roller being sandwiched between the middle disc and the outer disc;
   the cylindrical portion is included in the middle disc;
   the at least one bearing comprises a pair of bearings located at both sides of the gear in the direction along the rotation axis;
   each of the pair of bearings includes an outer ring, an inner ring, and a rolling element; and
   the cylindrical portion of the middle disc, the inner ring, and the gear are press-fitted to each other.

5. The toroidal continuously variable transmission according to claim 1, wherein the cylindrical portion is arranged at a radially outer side of a radially inner end of the disc main body.

6. A toroidal continuously variable transmission comprising:
   a rotating shaft;
   at least one pair of discs arranged around a rotation axis of the rotating shaft and opposed to each other;
   at least one power roller sandwiched between the at least one pair of discs so as to be tiltable;
   at least one bearing arranged between the rotating shaft and a casing; and
   a gear arranged around the rotation axis of the rotating shaft and connected to one of the pair of discs so as to transmit power to the disc, wherein:
   at least one of the pair of discs includes
      a disc main body including a concave surface opposed to the power roller and
      a cylindrical portion projecting from the disc main body along the rotation axis toward an opposite side of the power roller; and
   the cylindrical portion is inserted between the bearing and the rotating shaft;
   the at least one pair of discs comprises two pairs of discs lined up in the direction along the rotation axis;
   the at least one power roller comprises a pair of power rollers sandwiched by the two pairs of discs;
   the two pairs of discs include
      a pair of middle discs adjacent to each other and a pair of outer discs arranged outside the pair of middle discs in the direction along the rotation axis, each power roller being sandwiched between the middle disc and the outer disc;

the cylindrical portion is included in the middle disc;

the at least one bearing comprises a pair of bearings located at both sides of the gear in the direction along the rotation axis;

each of the pair of bearings includes an outer ring, an inner ring, and a rolling element;

the cylindrical portion of the middle disc, the inner ring, and the gear are press-fitted to each other;

the inner ring includes
- an inner ring main body opposed to the outer ring in a radial direction and
- an inner ring extension projecting in the direction along the rotation axis from the inner ring main body toward the gear beyond the outer ring;

the gear includes a recess opposed to the inner ring extension;

the cylindrical portion is press-fitted to the inner ring; and the inner ring extension is press-fitted to the recess of the gear.

7. The toroidal continuously variable transmission according to claim 6, wherein the inner ring further includes an end wall projecting from the inner ring extension toward a radially inner side so as to be sandwiched between an end surface of the cylindrical portion and a bottom surface of the recess.

8. The toroidal continuously variable transmission according to claim 6, wherein the cylindrical portion is arranged at a radially outer side of a radially inner end of the disc main body.

* * * * *